F. W. BURPEE.
ASSORTING MACHINE.
APPLICATION FILED DEC. 24, 1913.

1,150,171.

Patented Aug. 17, 1915.
4 SHEETS—SHEET 1.

WITNESSES:
F. C. Matheny
A. Haskins

INVENTOR
Frank W. Burpee
BY
C. D. Haskins
ATTORNEY

F. W. BURPEE.
ASSORTING MACHINE.
APPLICATION FILED DEC. 24, 1913.

1,150,171.

Patented Aug. 17, 1915.
4 SHEETS—SHEET 4.

WITNESSES:
F. C. Matheny
A. Haskins

INVENTOR
Frank W. Burpee
BY
C. D. Haskins
ATTORNEY

UNITED STATES PATENT OFFICE.

FRANK W. BURPEE, OF BELLINGHAM, WASHINGTON.

ASSORTING-MACHINE.

1,150,171.          Specification of Letters Patent.      Patented Aug. 17, 1915.

Application filed December 24, 1913. Serial No. 808,553.

*To all whom it may concern:*

Be it known that I, FRANK W. BURPEE, a citizen of the Dominion of Canada, residing at Bellingham, in the county of Whatcom and State of Washington, have invented a certain new and useful Improvement in Assorting-Machines, of which the following is a specification.

My invention relates to improvements in machines that are adapted automatically to operate to select and separate from a plurality of packages of merchandise, as packages of butter, cans containing fish, oysters, vegetables, fruit and the like, such ones of such packages as may be of a weight that is less than a desired predetermined amount; and the object of my improvement is to provide such machines that shall be simple in their plan of construction and be rapid and accurate in the operation.

I attain this object by devices illustrated in the accompanying drawings in which—

Figure 1:
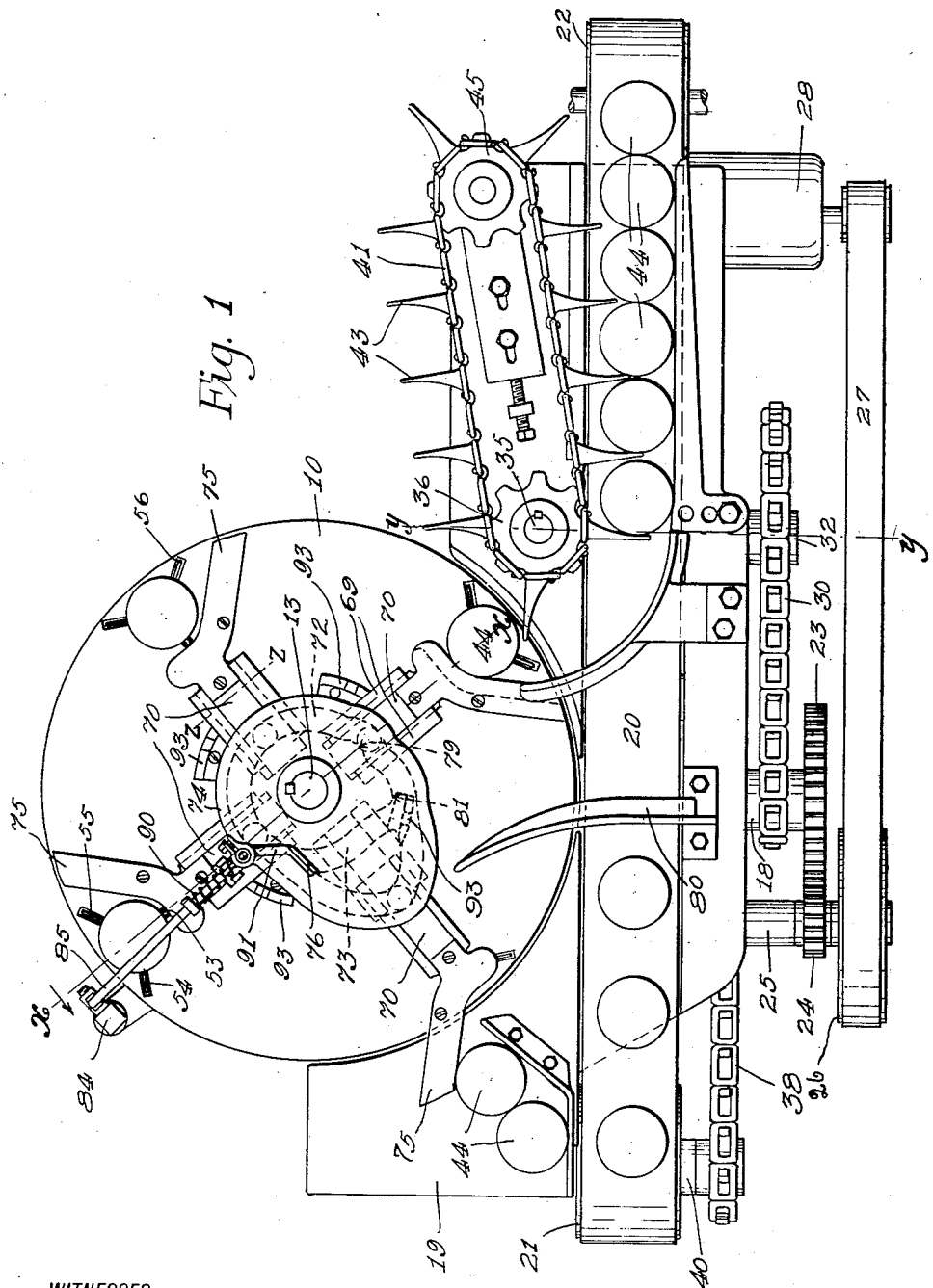
Figure 2:
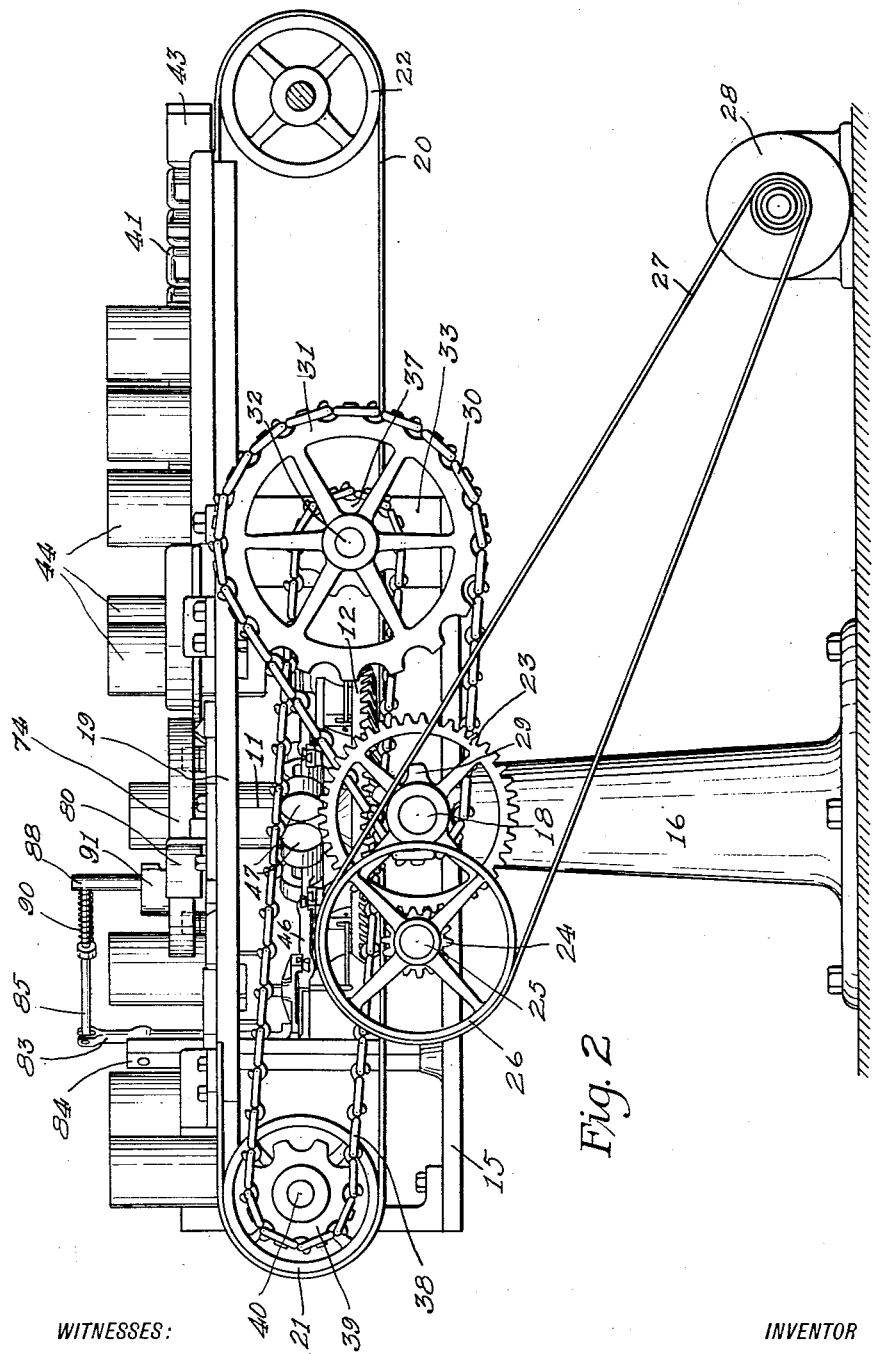
Figure 3:
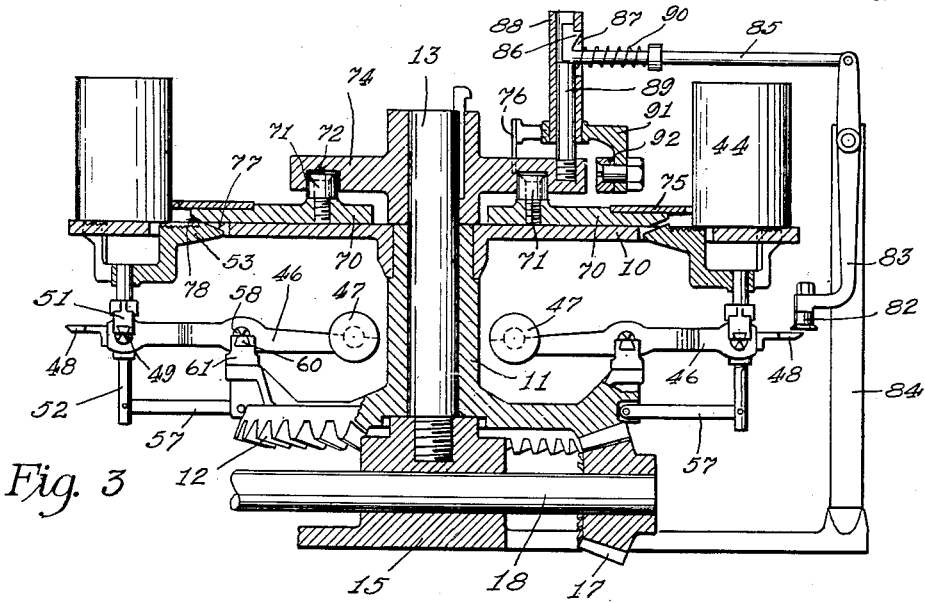
Figure 4:
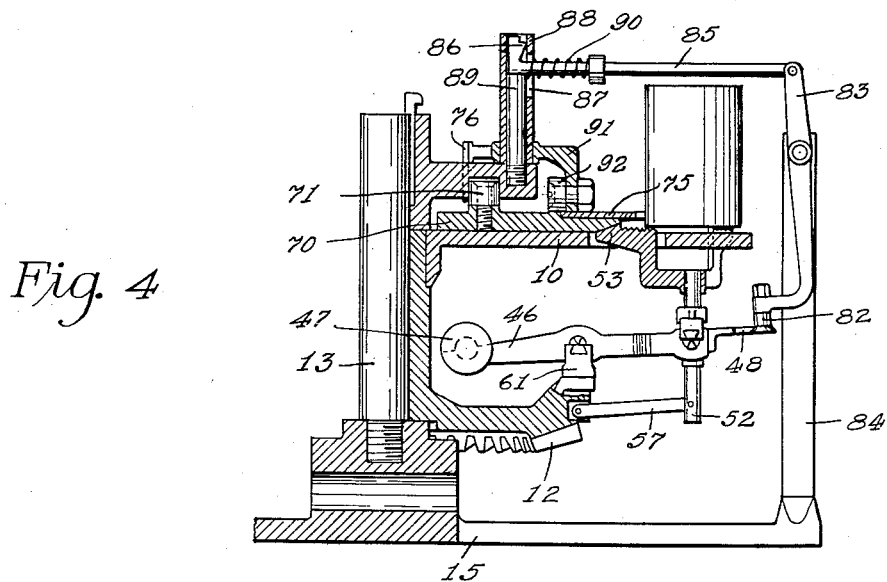
Figure 5:
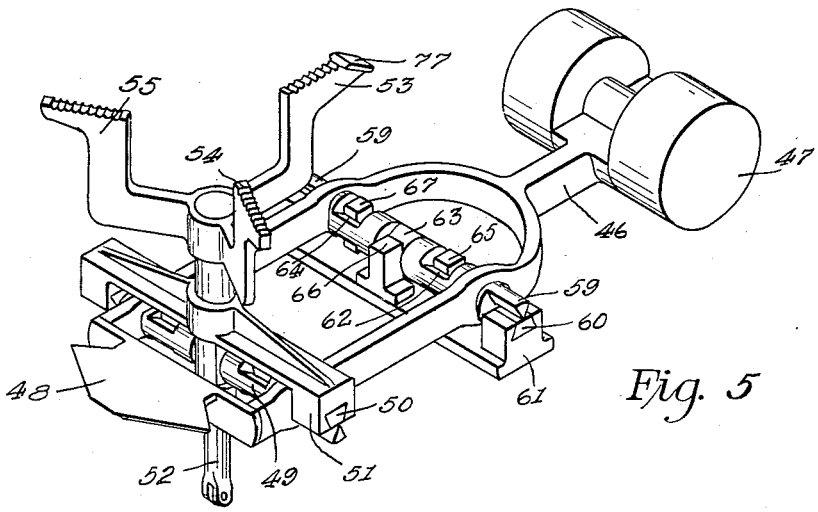
Figure 6:
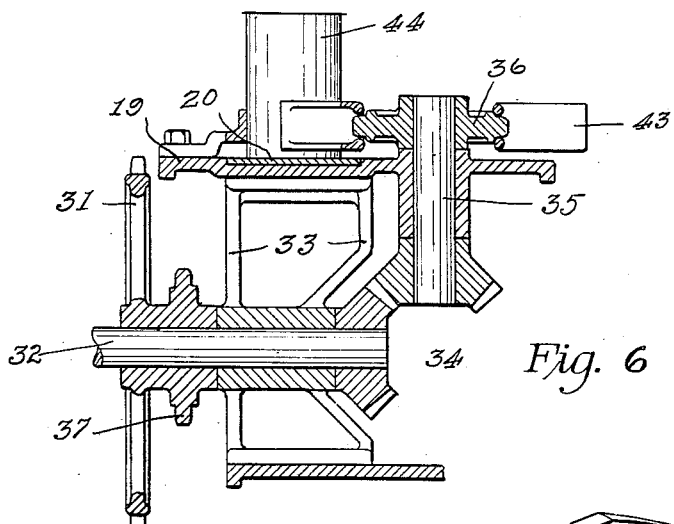
Figure 7:
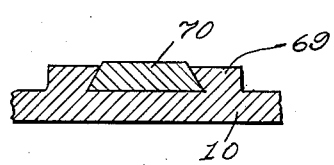
Figure 8:
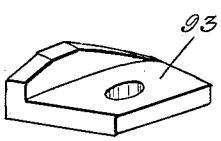
Figure 9:
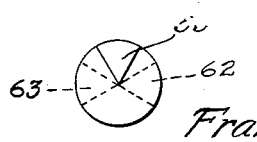

Figure 1 is a plan view of a machine embodying my invention; Fig. 2 is a view in side elevation of the same; Fig. 3 is a view in vertical section of the weighing table on broken line $x$, $x$ of Fig. 1, certain parts being shown in elevation; Fig. 4 is a similar view of a portion of the weighing table on the same line $x$, $x$ showing certain working parts in a different position; Fig. 5 is an isometric view of the scale mechanism; Fig. 6 is a view in vertical section on broken line $y$, $y$ of Fig. 1; Fig. 7 is an enlarged fragmentary view in cross-section on broken line $z$, $z$ of Fig. 1; Fig. 8 is an enlarged view in perspective of a detail of my invention and Fig. 9 is an enlarged view in end elevation of a bearing shaft embodied in the scale mechanism.

Like reference numerals indicate like parts throughout the drawings.

In order that the specific description of the structure embodying my invention as hereinafter set forth may be clearly understood I will briefly describe the principal parts of such structure and the general mode of operation of such parts.

In a general way my machine consists in a rotatable circular plate or table associated with a vertical shaft, on the under side of which plate is secured a plurality of scales or balances each of which scales is provided with a tripod consisting in three upwardly projecting can supporting arms that are adapted to extend through slots in said circular plate.

Articles to be operated upon, as cans containing fish, are conveyed by a moving belt to such rotating plate and by chain driven spacers they are each successively deposited on such moving plate directly above the top of the tripod of one of said scales, and after such can has been so deposited such tripod is automatically actuated to move upwardly to engage with the bottom of the can whereupon if such can be of a desired predetermined weight then it will not be lifted above the top surface of the plate and will be carried around by the plate and be delivered again onto the belt that carried it to the machine to be carried by such belt away from the machine; but if such can be of less weight than such desired predetermined amount, then the tripod will lift such can above the top surface of such plate to permit the outer end of a part of the scales to engage with the operative mechanism that will cause such can to be removed from said moving plate before such can reaches the belt that otherwise would convey such can from the machine.

Referring to the accompanying drawings, 10 is a circular table or plate that is secured to a sleeve 11 which is provided with a large bevel gearwheel 12 on its lower end, which sleeve 11 is disposed to rotate on a shaft 13, such shaft 13 being fixedly secured to a frame 15 which rests on a base or support 16. The bevel gearwheel 12 is adapted to mesh with a beveled pinion 17 that is provided on a driven shaft 18 whereby the plate 10 may be caused to rotate.

A shelf 19 that is flush with the top surface of the table 10 is cut away, as shown in Fig. 1, to extend partly around such table 10, and an endless belt 20, suitably mounted on pulleys 21 and 22, is adapted to run in a groove in the shelf 19 to convey cans to and from such table.

The shaft 18 is provided with a large gearwheel 23 that is adapted to mesh with a small gearwheel 24 which is provided on a shaft 25 which shaft 25 carries a belt pulley 26 and is adapted to be driven by a belt 27 that is connected with any suitable source of power, as a motor 28. A sprocket gearwheel 29 is provided on the shaft 18 and is connected by a sprocket chain 30 with another larger sprocket gearwheel 31 that is provided on a shaft 32 which is suitably journaled in a bracket 33 that is secured to the frame 15 and which is connected by bevel gearwheels 34, 34 with a vertical shaft 35 which extends upwardly through the shelf 19 and has a sprocket wheel 36 secured to the top end thereof slightly above the top surface of such shelf 19.

A small sprocket gearwheel 37 is secured to the shaft 32 and is connected by a sprocket chain 38 with another sprocket gearwheel 39 provided on a shaft 40 on which the belt pulley 21 is mounted whereby the belt 20 is driven.

A sprocket chain 41 is provided at regular intervals with outwardly projecting fingers 43, 43 that are adapted to engage with cans 44, 44 that are being conveyed toward the moving plate 10 on the belt 20 to deliver such cans 44, 44 one at a time to their proper positions on the rotating plate 10, and such sprocket chain 41 is associated with the driven sprocket gearwheel 36 to adapt it to pass around an idler sprocket wheel 45 which is provided with suitable means, as shown, by which its position may be changed to loosen or tighten said sprocket chain 41, the line of movement of such chain 41 being at a slight angle to the line of movement of the adjacent belt 20, as shown in Fig. 1, whereby the fingers 43, 43 may gradually engage with the cams 44, 44.

A plurality of balance scale levers 46 are each mounted on a fulcrum shaft 58 to oscillate on the top surface of the gearwheel 12 to be carried thereby with the plate 10, as more clearly shown in Fig. 3, and each is provided with a weight 47 on its inner end while on its outer end is fixed an engaging member 48.

49 is a shaft that is provided with a plurality of integrally formed A shaped knife edge pivot bearings herein shown to be five in number, as more clearly illustrated in Fig. 5, which bearings are all formed to have their apices on the center line of such shaft, the apices of the bearings on the two opposite ends of such shaft being directed upwardly in a substantially vertical plane when the scale is set up, while the apex of the one center bearing is directed in a substantially horizontal plane and the apices of the two bearings between the center bearing and the end bearings are directed in the same horizontal plane but in an opposite direction from the apex of the central bearing, and such shaft 49 is fixed to extend crosswise through each of said scale levers 46 and its A shaped end pivots are disposed to support agate bearings 50, 50 which are set in the ends of a cross-bar 51. Secured to said cross-bar 51 is a vertical bar 52 that projects upwardly and downwardly therefrom and on the top end of said vertical-bar 52 is secured a tripod whose arms 53, 54 and 55 are disposed to extend upwardly through slots 56, 56 in the rotatable plate 10 to engage with the bottom of a can while to the bottom end portion of such vertical-bar 52 is articulated the end of a link 57 whose other end is articulated with a projecting portion of the gearwheel 12 whereby said vertical bar 52 may be maintained with its axis parallel with the axis of the gearwheel 12 irrespective of its vertical movement, the vertical bar 52 at a point immediately below the cross-bar 51 being adapted to bear against the apex of the central bearing of the shaft 49 and such cross bar 51 being provided with suitable downwardly disposed lugs (not shown) which are similar to the lugs 65 and 67 hereinafter described and are adapted to bear against the apices of the bearings on the shaft 49 that are between the central bearing and the end bearing whereby the cross-bar 51 may be free to swing about the center line of the shaft 49 while rigidly supported against movement in a lengthwise direction of the scale arm 46.

Since the movement of the scale mechanism through its circular path causes the exertion of centrifugal force that tends to displace parts of such mechanism and since the contact of the engaging member 48 with other parts in its circular movement also tends to displace such scale mechanism I have provided means to prevent a sidewise displacement of the shaft 49, the fulcrum shaft 58 and the vertical-bar 52 without detracting perceptibly from the freedom of oscillation of the lever 46 or of the vertical movements of the bar 52. To do this the knife edge pivots 59, 59, of fulcrum shaft 58 are disposed to rest on agate bearings 60 provided in a cross-bar 61 that is secured to the gearwheel 12 thereby forming a sensitive support for the scale lever 46. The shaft 58 is further provided intermediate its length with knife edges 62, 63 and 64 that bear against the flat surface of studs 65, 66 and 67 respectively, the knife edge 63 being disposed oppositely to the knife edges 62 and 64, as more clearly shown in Fig. 5, to prevent endwise or twisting movement of the scale lever 46. The several knife edges 59, 62, 63 and 64 all being formed to be exactly on the center line of the shaft 58, as shown in Fig. 5, and more clearly illustrated in Fig. 9, in order that the scale lever 46 may be perfectly free to oscillate while prevented from moving otherwise. The shaft 49 is likewise provided with similar side bearing knife edges and agate faced limiting devices, as shown so clearly in Fig. 5 that further description is unnecessary.

The circular plate 10 is provided with four radially disposed can-ejecting arms 70, that are formed with beveled edges that slope toward the bottom surface thereof and are adapted to slide lengthwise in guides 69, 69 that may be formed integral with the plate 10 as shown in Fig. 7.

The can-ejecting arms 70 are each provided on their inner ends with upwardly projecting rollers 71 that are adapted to roll in cam slots 72 and 73 which are provided in the lower surface of a plate 74 that is fixedly secured to the top end of the shaft 13, and the outer ends of the arms 70 are each provided with removable plates 75 which project over the ends of such arms 70 and which may be quickly and easily taken off when cans of large diameter are to be weighed thus shortening the arms 70 to a proper length to fit such large cans.

The outer cam slot 72 follows closely to the outer edge of the plate 74 in the form of a somewhat irregular ellipse and the inner cam slot 73 extends across one end of such ellipse and connects the two sides of the cam slot 72 thus uniting with one portion of the slot 72 to form a slot having a somewhat irregular circular shape, the tendency of the rollers 71, 71 always being to follow the shorter cam slot 73 unless they are displaced by a gate 76 which is adapted to be lowered through a slot in the plate 74 to close the entrance to the cam slot 73 and cause the roll to pass around the outer cam slot 72.

The innermost tripod arm 53 is provided with a beveled end surface 77, one portion of which is adapted to project slightly above that portion of the arm 53 which engages with the bottom of the can, such beveled portion 77 being adapted to be engaged by an oppositely disposed beveled surface 78 that is provided on the end of its adjacent can-ejecting arm 70 as illustrated in Figs. 3 and 4, whereby when the can-ejecting arms 70 are moved outwardly the tripod arms 53, 54 and 55 of the scales will be depressed below the plane of the top surface of the plate 10 and when the arm 70 is withdrawn then such arms 53, 54 and 55 will be permitted to rise above the level of the top surface of the plate 10 to engage with the bottom of a can if there be a can on the plate 10.

A sharp curve 79 is provided in the cam slot 72 at a point adjacent to the point at which the cans are placed on the plate 10 such curve 79 serving to move each arm 70 outwardly sufficient to depress the scale tripod's arms 53, 54 and 55 below the top surface of the plate 10 while the can is being moved onto the plate and immediately to withdraw such arm 70 to allow the arms 53, 54 and 55 of the scale tripod to engage with the bottom of such can as soon as such can is properly placed.

If the can be of such weight that the scale will not lift it above the surface of the plate 10, as illustrated in Fig. 3, then such can will be carried around on the plate 10 to a point adjacent to the deflecting guide 80, the roller 71 of the ejecting-arm 70 following the inner slot 73 and being caused to move such ejecting-arm outwardly by the peculiar shape of such slot at the point 81 thus depressing the scale tripod and moving the can outwardly, which can is then intercepted at this point by the deflecting guide 80 that acts in conjunction with the ejecting arm to deflect the can and cause it to be delivered onto the belt 20.

If the can be too light in weight then the scale will raise it above the surface of the plate 10 as illustrated in Fig. 4, and the engaging member 48 on the end of the scale lever 46 will be raised sufficiently to engage with a trip roller 82, that is provided on the lower end of a vertical lever arm 83, that is pivotally mounted on a bracket 84 that is secured to the frame 15, and such engagement will move the bottom end of such lever arm 83 outwardly and its top end inwardly, such top end being connected with the outer end of a horizontal link 85 which has its inner end formed with an upwardly projecting catch 86 such inner end being adapted to project through a slot 87 that is formed in the side of a sleeve 88 which is adapted to slide vertically on a post 89 that is rigidly secured to the plate 74, the inner end of such link 85 being adapted to rest on the top of the post 89 and having associated therewith a helical compression spring 90 that has one of its ends bearing against the post 89 and its other end bearing against a sleeve that is fixedly secured to the link 85 whereby the spring 90 may tend at all times to move the link 85 outwardly, thus moving the top end of the lever arm 83 outwardly and the bottom end of such lever arm inwardly.

The gate 76 is carried by a bracket 91 that carries a lifting roller 92 and which is secured to the lower end of the sleeve 88.

Lifting dogs 93, more clearly shown in Fig. 8, are provided on the plate 10 directly in front of each of the ejecting-arms 70, such lifting dogs 93 being adapted to engage with the roller 92 to raise the sleeve 88 and its associated gate 76 and bracket 91 if such sleeve be in a lowered position before each scale comes opposite to the lever arm 83, the catch 86 being adapted to engage in the slot 87, as shown in Fig. 3, to hold such sleeve 88 in a raised position until it is tripped into the position shown in Fig. 4, by a light weight can which permits the gate 76 to drop and close the cam slot 73 thus causing the roller 71 to follow the outer cam slot 72 and the can to be ejected as a light weight before it reaches the belt 20.

During the brief period of the time that a can 44 is being moved into its proper position onto the plate 10 by the delivery chain 41 the arms 53, 54 and 55 of the scale tripod are withdrawn below the surface of the plate 10 by a slight outward movement of the ejecting-arm 70, in order that the sensitive scale bearings may not be subjected to the shock or pounding that would be occasioned if the object to be weighed were delivered directly onto such arms or onto a scale pan. When the can is in its proper position the arm 70 is withdrawn slightly thus leaving the can perfectly free and allowing the arms 53, 54 and 55 of the scale tripod to move gently upward and engage with the bottom of the can.

If the can be a full weight can it is not raised above the surface of the plate 10 but is carried around thereon and is delivered back onto the belt 20 by the action of the ejecting arm 70 and the deflecting bar 80 the arms 53, 54 and 55 of the scale tripod being lowered by contact of the bevel surface 78, of the ejecting arm, with the bevel surface 77 of the tripod arm 53 before the can is moved, in order that the bearings of the scale may be relieved of all possible strain.

If the can be of light weight then the outer end of the scale lever 46 will be raised above the plane of the bottom of the trip roller 82 as shown in Fig. 4 to raise the member 48 above the flange of said roller 82, after which the angular surface of the engaging member 48 will engage with the periphery of trip roller 82 to release the gate 76 and close the slot 83 whereupon the can will be ejected as a light-weight, as shown in Fig. 1, before it reaches the belt 20.

The weighing mechanism herein shown and described constitutes the subject-matter of another application for Letters Patent filed by me under date of April 27, 1914, Serial No. 834,848 and hence is not specifically claimed herein.

It will be understood that the principles of construction and mode of operation hereinbefore set forth may be embodied in a machine whose details differ widely from my device without departing from the spirit of my invention or sacrificing any of its advantages.

What I claim is:

1. In a machine of the class described, the combination with a rotatable table having a plurality of scales secured thereto, of a fixed plate provided with cam slots, ejecting arms, rollers provided on said ejecting arms and disposed to roll in said cam slots, a gate, and mechanism actuated by said scales to release said gate and close one of said cam slots whereby said rollers will be guided to follow another of said slots.

2. In a machine of the class described, the combination with a rotatable table having a plurality of scales secured thereto, of ejecting arms slidably mounted on said table and provided with upwardly projecting rollers, a plate provided with cam slots to guide said rollers to move said ejecting arms radially of said table, a gate, mechanism connected with said gate and disposed to be actuated by said scales to lower said gate and close one of said cam slots whereby said rollers may follow another of said cam slots and impart a different radial movement to said ejecting arms, and lifting dogs provided on said rotatable table adjacent said ejecting arms to lift said gate.

3. In a machine of the class described, the combination with a rotatable table, of a plurality of scales disposed below said table and adapted to move therewith, means for delivering articles on said table one at a time, radially movable ejecting arms slidably mounted on said table and adapted to discharge said articles from said table at suitable points, rollers on said arms, a fixed plate provided with cam slots, a gate, and means actuated by said scales to release said gate.

In witness whereof, I, hereunto subscribe my name this sixteenth day of December A. D., 1913.

FRANK W. BURPEE.

Witnesses:
A. HASKINS,
F. C. MATHENY.